Jan. 10, 1950 J. B. BIDWELL ET AL 2,494,427
DEAERATOR
Filed Feb. 7, 1945
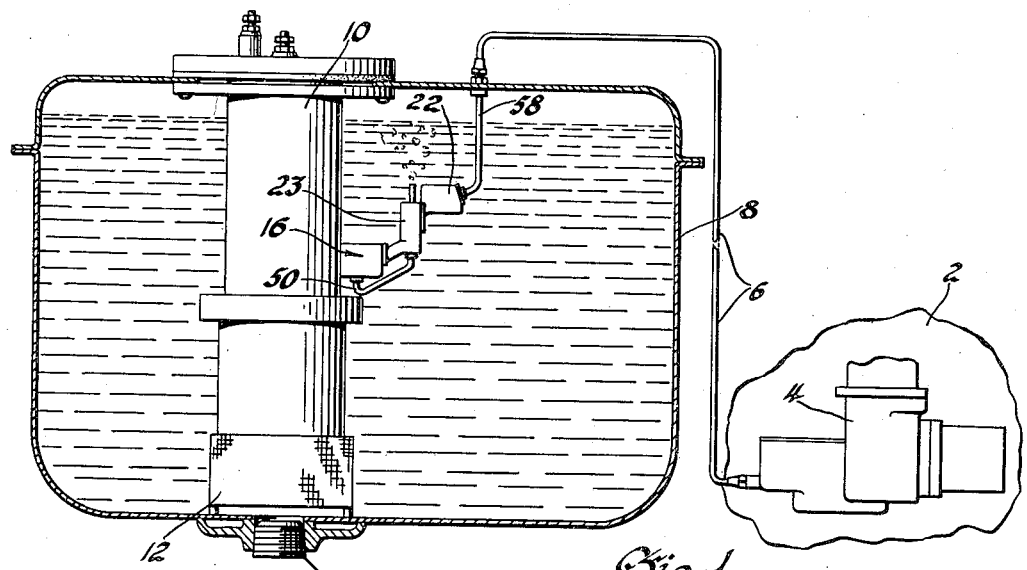
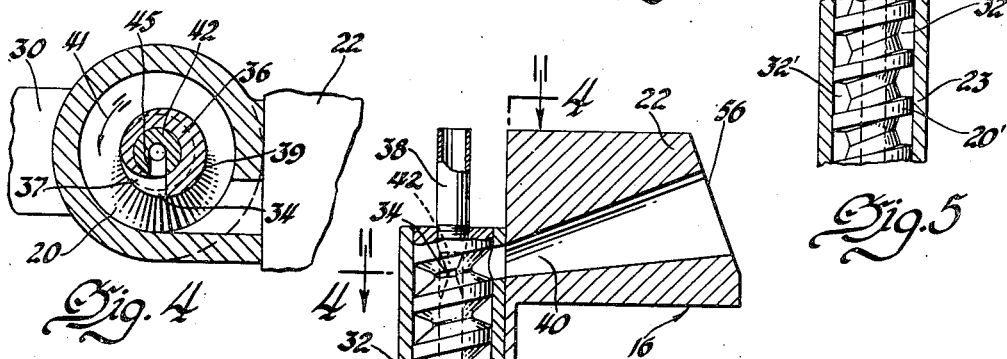
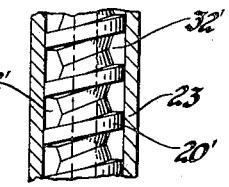
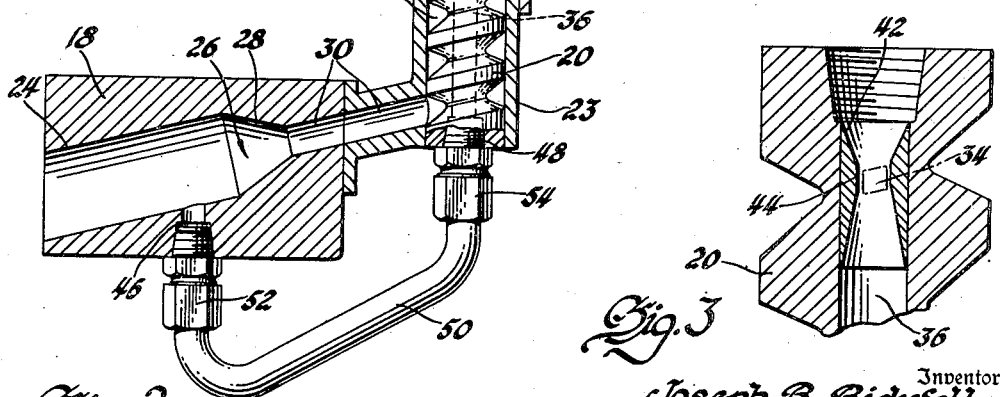
Inventors
Joseph B. Bidwell &
Arthur F. Underwood
By Blackmore, Spencer & Hunt
Attorneys Patented Jan. 10, 1950

2,494,427

UNITED STATES PATENT OFFICE 2,494,427

DEAERATOR

Joseph B. Bidwell, Philadelphia, Pa., and Arthur F. Underwood, Grosse Pointe, Mich., assignors to General Motors Corporation, Detroit, Mich., a corporation of Delaware Application February 7, 1945, Serial No. 576,640

8 Claims. (Cl. 183—2.5)

This invention relates to the provision of means to remove air, both dissolved air and entrained air, from liquids within which it may occur. The invention is primarily concerned with the removal of air from the liquid fuel which is being used to supply an internal combustion engine, especially an aircraft engine, but it will be obvious that such air separation has many other fields of usefulness.

It is known that in the ordinary liquid fuel (gasoline) used in connection with aircraft engines that there is some air contained in the fuel. The efficiency of the engine is improved when all of this air is removed from the gasoline and the fuel arrives at the carburetor in a state in which it is as free from air as possible. It is the object of the present invention to design a structure which will remove from the liquid fuel the dissolved and undissolved air before the fuel arrives at the carburetor.

The structure of the invention includes a tapered tube through which the fuel is forced to pass by the fuel pump. In passing through the tapered tube there is a loss of pressure and an increase in flow and as soon as the pressure in the liquid is decreased the dissolved air will form into bubbles and tend to leave the liquid. Immediately after passing through the tapered tube the fuel is caused tangentially to enter a helical channel and rapidly to pass therethrough. The channel of the helix should be of such shape as to best carry out its purpose. A channel believed to be most desirable is generally rectangular in cross section with its bottom wall adjacent the axis of the helix having a flat V outline. It might be of triangular section but the rectangular shape with the V base gives a desirable greater cross-sectional area. The fuel will be given a rotary motion in passing through the helix and centrifugal force will cause the heavier liquid particles of the liquid and air mixture to move toward the radially outer portion of the helical passage, and thus by displacement cause the lighter particles (the air) to gather at the middle, or in the bottom of the triangle or V of the groove. Adjacent the end of the helix an opening in the form of a slot is provided in the bottom of the channel and by tapering the incoming edge of the slot the air will be caused to pass into the slot and out through a bore in the center of the helix. The remainder of the fuel will pass off tangentially of the helix. A diffuser tube at the end of the helix is used for the purpose of regaining as much as possible of the original pressure head of the liquid.

In some instances, where the pressure of the liquid and air mixture in the helical passage just above the air outlet slot is less than atmospheric or near atmospheric, it is desirable to decrease the pressure on the liquid immediately below the slot or opening at the end of the helix in order to create a pressure differential so that the air will flow out through the slot. To accomplish this purpose a Venturi tube is positioned inside the helix or on the axis thereof and the throat of the venturi is positioned immediately under the opening or slot. A small portion of the fuel is forced by the pump to pass axially through the helix and as this small quantity of liquid passes through the venturi there will be a drop in pressure immediately below the slot or opening which will enable the air better to pass out of the helix.

On the drawing:

Figure 1 is a sectional view through a gasoline tank or reservoir having an enclosed pump and showing the invention applied, a part of an internal combustion engine and its carburetor being generally indicated.

Figure 2 is a sectional detailed view through the deaerator of the invention.

Figure 3 is an enlarged detailed view showing the Venturi tube inside the helix.

Figure 4 is an enlarged sectional detailed view through the exit opening in the helix and showing the manner in which the leading edge of the slot is tapered, taken on the line 4—4 of Figure 2.

Fig. 5 is a detail of a preferred form, a modification of the form shown in Fig. 2.

On the drawing a part of an internal combustion engine is indicated at 2. The engine has the usual carburetor 4 indicated diagrammatically. A tube 6 leads from the carburetor to the fuel tank or reservoir 8 of the airplane. The reservoir has the pump 10 mounted in the gas tank. This pump is of a type shown in the patents to Lauer, 2,254,495 or 2,352,958, issued September 2, 1941 and July 4, 1944, but can be of any suitable type. The bottom of this pump is provided with a screen 12 over the pump inlet and the bottom of the tank has an outlet or drain plug 14. The parts so far described are conventional and per se form no part of the invention.

The deaerator of the invention is indicated as a whole at 16. The deaerator in general comprises the inlet tube or plug 18, the helix 20 enclosed in a shell 23 and the diffuser 22. The inlet 18 has the passage 24 which receives the fuel from the pump 10. The tube 18 is secured to the pump housing in any suitable way, the particular means in which it is secured forming no part of the invention. The passage 24 merges into a tapered tube 26 having a wall 28. From the tube 26 extends the outlet 30. The purpose of this expedient is to decrease the pressure in the fuel as it is forced by the pump through the plug 18. As the fuel passes through the plug 18 a certain amount of turbulence will be given to the fuel and the decrease in pressure will cause the dissolved air to be freed. It is well known that the decrease in pressure on a liquid tends to cause dissolved air to be released.

Immediately after the liquid fuel passes through the inlet tube and out of the outlet passage 30 thereof, it is caused tangentially to enter the helix 20. The cross section of the channel 32 in the helix is triangular or V shaped as is shown in Figure 2 and the cross sectional area of this triangle a V is substantially the same as the cross sectional area of the exit passage 30 from the venturi. The pump will cause the liquid fuel rapidly to pass in the spirals of the helix 20 and this movement will cause the air to collect at the center of the helix, or at the bottom of the V-channel, due to the centrifugal force. At the end of the helix the bottom of the channel is provided with a slot or opening 34 to enable the air to pass inwardly of the helix and into the bore 36 thereof. From the bore 36 the air will pass upwardly into the tube 38 screwed into the end of the bore, and from the tube 38 the air will bubble through the liquid and rise to the top as is shown in Figure 1. If desired the tube 38 can extend to the top of the tank 8.

Referring to Figure 4 it will be seen that the leading edge 37 of the opening 34 is tapered gradually until the edge substantially disappears at the opening 34 while the following edge 39 is unchanged. With the liquid traveling in the direction of the arrow 41 and with the opening tapered as shown at 37, the air will be given a better chance to be at the exit of the opening 34 before it is forced into the bore 36 of the helix. If this structure were not provided the momentum given to the air as it passes the opening 34 would tend to carry a considerable part of the air past the opening. For this reason the opening 34 is made in the form of a slot and the leading or incoming edge 37 is tapered. The size of the slot will be determined by the individual needs and the amount of fuel to be passed through the helix.

At the end of the helix 20 the fuel is caused to pass tangentially therefrom into a passage 40 formed in a diffuser tube 22. The passage 40 is tapered and gradually increases in size, as is shown in Figure 2, for the purpose of recovering as much as possible of the original pressure head in the liquid.

For ordinary purposes a structure such as described is ample to take the dissolved and undissolved air out of the liquid but in some instances it is desirable to decrease the pressure on the liquid under the slot or opening 34 to assist the air in leaving the bottom of the channel of the helix. For this purpose a venturi 42 is positioned inside the helix 20 in the bore 36 thereof and this venturi has its throat 44 immediately below the slot or opening 34. The throat of the venturi 42 has an opening 45 mating with the opening 34. The inlet tube or plug 18 is provided with a threaded opening 46 and the bottom of the bore 36 of the helix is provided with a threaded opening 48. A suitable pipe 50 having connections 52 and 54 is provided and by applying the connection 52 to the threaded opening 46 and the connection 54 to the threaded opening 48 the pump 10 will force a small amount of the fuel through the opening 46, the tube 50, and the bore 36 through the venturi 42. As the fuel in the venturi passes through the throat 44 of the venturi there will be a pressure drop which will enable the air easier to pass inward of the helix through the slot 34. When the pipe 50 and the venturi 42 are not used, the openings 46 and 48 are closed by suitable plugs, such as shown at 14 in Figure 1. In some instances, the use of the tube 50 and the venturi 42 are not required. In general the structure of the tubes 50 and 42 is optional and the device will work sufficiently well without the venturi 42 so that ordinarily the venturi 42 is not used.

The exit 56 from the diffuser tube 22 has attached thereto the tube 58 which is connected at the wall of the reservoir 8 to the tube 6 which leads to the carburetor.

The operation of the device is as follows: The pump will force the fuel in the tank 8 into the passage 24 and cause it to pass through the tube 26. When the fuel passes through the tube it will receive a considerable amount of turbulence and the drop in pressure will cause the dissolved air to be released and pass mixed with the fuel through the outlet passage 30. The fuel will immediately enter tangentially into the helical passage 32 and the rapid movement of the fuel through this passage will impart to it a considerable centrifugal force which will cause the heavier liquid particles to move toward the outer portion of the helical passage and thus cause the undissolved air and freed air, the lighter constituent in the fuel, to be crowded to the bottom of the helix or at the apex of the V 32. By the time the fuel reaches the end of the helix all of the air will be crowded to the bottom of the V and as it reaches the slot or opening 34 the air will be forced through the opening into the bore 36 of the helix and pass upward through the tube 38 and bubble through the liquid to the top of the tank 8. The fuel freed from the air will pass tangentially from the helix 20 into the passage 40 in the diffuser 22 and from the diffuser through the tubes 58 and 6 to the carburetor. Instead of using a helix which is triangular in cross section, I now believe one 20' having the shape shown by Fig. 5 is to be preferred. In this form the shape of the helical passage 32' is generally rectangular. Its wall adjacent the axis of the helix is of V form, in this respect corresponding to the walls of the passage in Fig. 2. This preferred form provides a greater cross-sectional area and is therefore more efficient.

In connection with the helix 20 or 20' it is desired to have the turns of the helix as small as possible in order that a considerable amount of centrifugal force be given to the fuel. In the reduction to practice of the invention it was found that a helix having an exterior radius of .47 of an inch and an inner radius of .20 of an inch with three turns in the helix gave satisfactory results and eliminated the air. The inner and outer diameter of the helix and the number of turns used will vary according to the design and the amount of fuel which it is desired to handle. If greater efficiency is desired, then more turns may be added to the helix, particularly in cases where the speed of the liquid is slow. When the liquid passes rapidly through the helix, fewer turns are needed. The efficiency of the helix may also be increased by decreasing the radial dimension of the channel.

In regard to the outlet of tapered tube 26 it must be of a size sufficiently small so that the pressure drop therethrough is sufficiently large to cause the air or gas in the liquid to come out of solution.

We claim:

1. In a deaerating system, a conduit for conveying liquid under pressure, a deaerating unit located in said conduit having a convergent passage portion, a spiral passage portion and a divergent passage portion, said convergent passage portion connecting said conduit to the entrance end of said spiral passage portion, said divergent passage portion connecting the discharge end of said spiral passage portion to said conduit, said spiral passage portion having a smaller cross sectional area than said conduit to increase the velocity of the flow through the spiral passage portion, an air vent opening in said spiral passage portion and an air discharge passage extending from said opening.

2. The invention as defined by claim 1, said spiral passage portion having angularly related walls meeting in a vertex defining the passage portion nearest the axis of said spiral passage portion and said air vent opening being positioned at said vertex.

3. The invention as defined by claim 1, said spiral passage portion being imperforate and said air vent opening being located at the discharge end of said spiral passage portion.

4. The invention as defined by claim 1, said spiral passage portion being imperforate, said air vent opening being located at the discharge end of said spiral passage portion, a vent passage within said spiral passage portion, a venturi having a throat in said vent passage, said air discharge passage connecting said air vent opening to the vent passage at the Venturi throat, and means to supply fluid pressure to said vent passage.

5. In a deaerating system, a conduit for conveying a liquid under pressure, a deaerating unit located in said conduit having a convergent passage portion, an imperforate spiral passage portion, and a divergent passage portion, said convergent passage portion connecting said conduit to the entrance end of said spiral passage, said divergent passage portion connecting the discharge end of said spiral passage to said conduit, an air venting passage communicating with the discharge end of said spiral passage.

6. The invention defined by claim 5, said spiral passage portion having angularly related walls meeting in a vertex defining the passage portion nearest the axis of said spiral passage portion and said air venting passage communicating with the vertex of said spiral passage portion.

7. The invention defined by claim 5, a vent passage, a venturi having a throat in said vent passage, means to supply fluid pressure to said vent passage, said air venting passage also communicating with the throat of said venturi.

8. In a deaerating system, a tank, a pump in said tank having an inlet opening into said tank and an outlet, a conduit extending from said pump outlet, a deaerating unit located within said tank and connected to said conduit, said deaerating unit having a converging conduit portion, a spiral conduit portion, and a divergent conduit portion consecutively connected, an air vent passage connected to said spiral conduit portion adjacent the end connected to the divergent conduit portion, an outlet conduit connected to said divergent conduit portion and extending out of said tank.

JOSEPH B. BIDWELL.
ARTHUR F. UNDERWOOD.

REFERENCES CITED

The following references are of record in the file of this patent:

UNITED STATES PATENTS

| Number | Name | Date |
|---|---|---|
| 1,387,748 | Wilson | Aug. 16, 1921 |
| 2,147,993 | Scheibe | Feb. 21, 1939 |
| 2,187,646 | Darrieus | Jan. 16, 1940 |
| 2,223,112 | Lear | Nov. 26, 1940 |
| 2,228,401 | Pressler | Jan. 14, 1941 |
| 2,277,651 | Steele | Mar. 24, 1942 |
| 2,316,729 | Tyron | Apr. 13, 1943 |
| 2,323,525 | Ebel | July 6, 1943 |

FOREIGN PATENTS

| Number | Country | Date |
|---|---|---|
| 209,439 | Great Britain | Jan. 7, 1924 |
| 308,010 | Great Britain | Mar. 21, 1929 |
| 541,252 | France | July 22, 1922 |
| 308,288 | Germany | Oct. 8, 1918 |
| 687,966 | Germany | Jan. 18, 1940 |